(12) United States Patent
Tanahashi et al.

(10) Patent No.: US 8,529,737 B2
(45) Date of Patent: Sep. 10, 2013

(54) PORTABLE DEVICE FOR REGULATING HARDNESS OF DRINKING WATER

(75) Inventors: Seiji Tanahashi, Osaka (JP); Masakazu Tanahashi, Osaka (JP); Takanori Nakano, Osaka (JP)

(73) Assignee: Tanah Process Ltd., Osaka (JP)

( * ) Notice: Subject to any disclaimer, the term of this patent is extended or adjusted under 35 U.S.C. 154(b) by 308 days.

(21) Appl. No.: 12/934,123

(22) PCT Filed: Mar. 24, 2009

(86) PCT No.: PCT/JP2009/055807
§ 371 (c)(1),
(2), (4) Date: Sep. 23, 2010

(87) PCT Pub. No.: WO2009/119572
PCT Pub. Date: Oct. 1, 2009

(65) Prior Publication Data
US 2011/0042206 A1 Feb. 24, 2011

(30) Foreign Application Priority Data

Mar. 25, 2008 (JP) .................................. 2008-079285

(51) Int. Cl.
*C02F 1/46* (2006.01)
(52) U.S. Cl.
USPC ........................................ 204/271; 204/232
(58) Field of Classification Search
USPC .................................................. 204/271, 283
See application file for complete search history.

(56) References Cited

U.S. PATENT DOCUMENTS 2,505,228 A * 4/1950 Chase ........................... 204/271
3,730,885 A 5/1973 Makrides et al.
(Continued)

FOREIGN PATENT DOCUMENTS

CN 200946111 9/2007
EP 1 284 238 2/2003
(Continued)

OTHER PUBLICATIONS

Yang, H. et al. "Application of Activated Carbon Fibers Electrodes to Capacitive Deionization of NaCl Solutions". Journal of Beijing Technology and Business University (Natural Science Ed), vol. 24,No. 2, Mar. 2006, pp. 9-12.
(Continued)

*Primary Examiner* — Keith Hendricks
*Assistant Examiner* — Salil Jain
(74) *Attorney, Agent, or Firm* — Hamre, Schumann, Mueller & Larson, P.C.

(57) ABSTRACT

The portable device of the present invention for regulating the hardness of drinking water includes a collapsible electrode group (20) including ion-adsorbing electrodes (21) and (22) and a power supply (13) for applying a voltage between the ion-adsorbing electrode (21) and the ion-adsorbing electrode (22). The first ion-adsorbing electrode (21) includes a first electrically conductive material capable of adsorbing ions. The second ion-adsorbing electrode includes a second electrically conductive material capable of adsorbing ions. In an example, a voltage is applied between the first ion-adsorbing electrode (21) and the second ion-adsorbing electrode (22), with the first and second ion-adsorbing electrodes (21) and (22) being immersed in the drinking water (25). The applied voltage regulates the amount of ions adsorbed on the first and second electrically conductive materials, and thereby the hardness of the drinking water is regulated.

13 Claims, 11 Drawing Sheets

(56) References Cited

U.S. PATENT DOCUMENTS

| | | | |
|---|---|---|---|
| 4,888,098 A | | 12/1989 | Nyberg et al. |
| 5,192,432 A | | 3/1993 | Andelman |
| 5,196,115 A | | 3/1993 | Andelman |
| 5,240,572 A | | 8/1993 | Turner et al. |
| 5,415,768 A | | 5/1995 | Andelman |
| 5,447,110 A | * | 9/1995 | Brown ............................. 141/2 |
| 5,456,812 A | * | 10/1995 | Chak ............................. 204/225 |
| 5,620,597 A | | 4/1997 | Andelman |
| 5,748,437 A | * | 5/1998 | Andelman .................... 361/302 |
| 5,846,390 A | | 12/1998 | Eki et al. |
| 5,897,765 A | | 4/1999 | Mercier |
| 5,925,230 A | | 7/1999 | Fajt et al. |
| 6,090,259 A | | 7/2000 | Fajt et al. .................... 204/666 |
| 6,139,714 A | | 10/2000 | Livshits |
| 6,315,886 B1 | * | 11/2001 | Zappi et al. .................. 205/701 |
| 6,761,809 B2 | | 7/2004 | Tran et al. .................. 204/286.1 |
| 6,778,378 B1 | | 8/2004 | Andelman .................... 361/302 |
| 6,798,639 B2 | * | 9/2004 | Faris et al. .................... 361/302 |
| 7,008,709 B2 | * | 3/2006 | Keegan et al. ................ 429/430 |
| 7,090,753 B2 | * | 8/2006 | Sumita .......................... 204/263 |
| 7,419,649 B2 | * | 9/2008 | Lundquist et al. ........ 423/445 R |
| 2002/0170830 A1 | | 11/2002 | Kondo et al. |
| 2003/0029718 A1 | | 2/2003 | Faris |
| 2003/0183516 A1 | | 10/2003 | Klose |
| 2009/0114598 A1 | * | 5/2009 | van Kralingen et al. ...... 210/676 |
| 2009/0134029 A1 | | 5/2009 | Tanahashi et al. |
| 2009/0205975 A1 | | 8/2009 | Tanahashi et al. |
| 2009/0223811 A1 | | 9/2009 | Tanahashi et al. |
| 2010/0069600 A1 | * | 3/2010 | Morelle et al. ................ 528/271 |
| 2011/0108437 A1 | | 5/2011 | Tanahashi et al. |

FOREIGN PATENT DOCUMENTS

| | | |
|---|---|---|
| JP | 1-150113 | 6/1989 |
| JP | 04-231488 | 8/1992 |
| JP | 4-284889 | 10/1992 |
| JP | 5-258992 | 10/1993 |
| JP | 5-309370 | 11/1993 |
| JP | 6-325983 | 11/1994 |
| JP | 7-108274 | 4/1995 |
| JP | 7-299457 | 11/1995 |
| JP | 8-019781 | 1/1996 |
| JP | 8-243565 | 9/1996 |
| JP | 8-299990 | 11/1996 |
| JP | 11-501568 | 2/1999 |
| JP | 2000-091169 | 3/2000 |
| JP | 2000-153278 | 6/2000 |
| JP | 2001-000828 | 1/2001 |
| JP | 2001-129553 | 5/2001 |
| JP | 2001-518389 | 10/2001 |
| JP | 2001-524388 | 12/2001 |
| JP | 2003-117550 | 4/2003 |
| JP | 2003-334549 | 11/2003 |
| JP | 2004-024990 | 1/2004 |
| JP | 3103152 | 5/2004 |
| JP | 2004-305842 | 11/2004 |
| JP | 2005-219045 | 8/2005 |
| JP | 2006-175360 | 7/2006 |
| JP | 2006-247640 | 9/2006 |
| JP | 2007-75673 | 3/2007 |
| WO | 93/13844 | 7/1993 |
| WO | 94/26669 | 11/1994 |
| WO | 00/14304 | 3/2000 |
| WO | 2006/132160 | 12/2006 |
| WO | WO 2007/037193 | 4/2007 |
| WO | WO 2007/132645 | 11/2007 |

OTHER PUBLICATIONS

Yin, G. et al. "Progress in Capacitive Deionization", Technology of Water Treatment, vol. 29, No. 2, Apr. 2003, pp. 63-66.

* cited by examiner

PORTABLE DEVICE FOR REGULATING HARDNESS OF DRINKING WATER

TECHNICAL FIELD

The present invention relates to portable devices for regulating the hardness of drinking water.

BACKGROUND ART

Today, international travel has become commonplace. It is important for travelers to ensure drinking water at their travel destinations. Commercially available mineral waters are convenient drinking water for travelers. However, travelers unfamiliar with hard water may become ill with hard water because most of the mineral waters available in Europe, etc. are hard water. It is therefore convenient for travelers to have a portable device that can regulate the hardness of drinking water.

Water softening devices for reducing water hardness have been developed (see JP 2003-117550 A, JP 2003-334549 A, etc.). Conventionally developed water softening devices soften water using ion-exchange resins. In the water softening devices using the ion-exchange resins, sodium ion bonded to ion-exchange groups in the ion-exchange resins is replaced with calcium ion or magnesium ion in water. As a result, calcium ion and magnesium ion are adsorbed by the ion-exchange resins, and thus the water is softened. However, the ion-exchange resins have a limitation in their ion-exchange capacity. Accordingly, ion-exchange resins that have adsorbed a certain amount of calcium ion and magnesium ion need to be regenerated using sodium chloride water.

The conventional water softening devices using the ion-exchange resins have a problem in that they are difficult to be miniaturized and are not suitable for carrying. Moreover, the conventional water softening devices using the ion-exchange resins have a problem in that the regeneration of the ion-exchange resins takes a relatively long time. Moreover, the conventional water softening devices using the ion-exchange resins have a problem in that sodium chloride water is required to regenerate the ion-exchange resins.

DISCLOSURE OF INVENTION

With the foregoing in mind, it is an object of the present invention to provide a novel portable device for regulating water hardness.

In order to achieve the object, the portable device according to the present invention for regulating the hardness of drinking water includes: a collapsible electrode group including first and second ion-adsorbing electrodes; and a power supply, wherein the first ion-adsorbing electrode includes a first electrically conductive material that is capable of adsorbing ions, the second ion-adsorbing electrode includes a second electrically conductive material that is capable of adsorbing ions, and a voltage is applied between the electrodes in the electrode group, with the electrode group being immersed in the drinking water, to regulate an amount of ions adsorbed on the first and second electrically conductive materials, and thereby the hardness of the drinking water is regulated.

The device of the present invention for regulating water hardness regulates the hardness of drinking water using an electrically conductive material that is capable of adsorbing ions. Because of this, the device of the present invention has a simple structure, and is easy to be miniaturized and is easy to carry. Moreover, the electrodes in the device of the present invention can be regenerated in a short time. Moreover, the device of the present invention does not need sodium chloride water to regenerate its electrodes. The device of the present invention therefore is easy to use while traveling.

BRIEF DESCRIPTION OF THE DRAWINGS

FIG. 3A shows a state where the container is extended.

FIG. 4A shows a state where the container is extended.

BEST MODE FOR CARRYING OUT THE INVENTION

Figure 1:
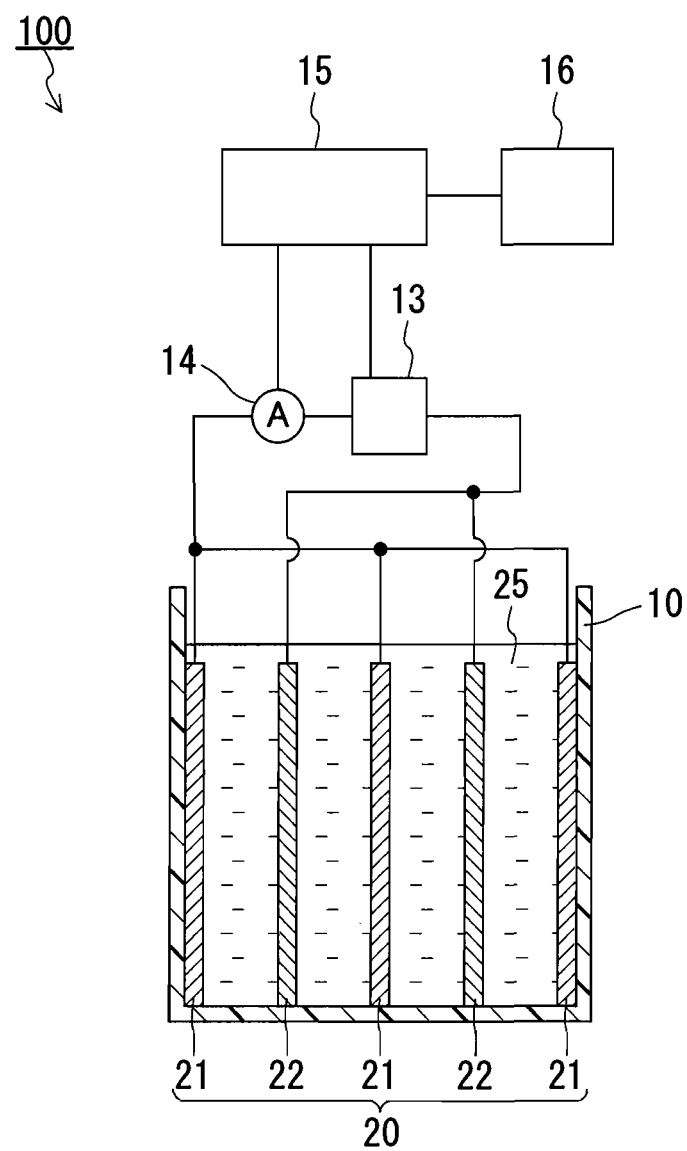
FIG. 1 schematically shows an example of the device of the present invention.

Hereinafter, embodiments of the present invention are described. In the following description, embodiments of the present invention are described by way of example, and the present invention is not limited to the examples described below. In the description referring to drawings, the same reference numerals are used to indicate like parts, and a repetitive description is omitted in some cases. Furthermore, the drawings referred in the following description are schematic drawings.

[Device for Regulating Water Hardness]

The portable device of the present invention for regulating water hardness is a device for regulating the hardness of drinking water. This device includes a collapsible electrode group including first and second ion-adsorbing electrodes and includes a power supply for applying a voltage between the first ion-adsorbing electrode and the second ion-adsorbing electrode. The first ion-adsorbing electrode includes a first electrically conductive material that is capable of adsorbing ions. The second ion-adsorbing electrode includes a second electrically conductive material that is capable of adsorbing ions. In this device, a voltage is applied between the electrodes in the electrode group, with the electrode group being immersed in the drinking water, to regulate the amount of ions adsorbed on the first and second electrically conductive materials, and thereby the hardness of the drinking water is regulated.

Here, examples of the "collapsible electrode group" include an electrode group that can reduce the distance between adjoining electrodes to reduce the space occupied by the electrode group. Moreover, examples of the "collapsible electrode group" include an electrode group that can be collapsed to reduce the space occupied by the electrode group. In other words, the electrode group used in the present invention is an electrode group that can reduce the space occupied thereby while not in use compared to the space while in use.

In an example, a voltage is applied between the first ion-adsorbing electrode and the second ion-adsorbing electrode, with the first and second ion-adsorbing electrodes being immersed in the drinking water, to regulate the amount of the ions adsorbed on the first and second electrically conductive materials, and thereby the hardness of the drinking water is regulated.

The device of the present invention may further include a collapsible container. In this case, when the container is collapsed, the electrode group may be collapsed to be put in the container. Moreover, when the container is collapsed, the electrode group may be taken out from the container.

In the device of the present invention, the electrode group can be an electrode group that needs not be collapsible. That is, the device of the present invention may employ an electrode group that is not collapsible. In that case, however, the device has a disadvantage in that it cannot be made compact while not in use. Moreover, the device of the present invention may employ a container that is not collapsible.

The container is formed of a material that can hold drinking water and that is collapsible. For example, the container may be formed of synthetic resins or formed of cloth coated with rubber. An example of the container is a container that can be collapsed like an accordion. The amount of the drinking water that can be put in the container is not limited, and may be in the range of, for example, 0.3 to 10 liters (e.g., in the range of 0.5 to 3 liters) in view of portability. The container may include a means for facilitating the replacement of a liquid in the container. For example, the container may include an inlet for allowing a liquid to flow into the container and an outlet for discharging the liquid that is in the container.

Each of the first and second ion-adsorbing electrodes may be a planar electrode. In that case, the first and second ion-adsorbing electrodes preferably are disposed so that the first ion adsorbing electrode and the second ion-adsorbing electrode are parallel to each other when the electrode group is extended. Such an embodiment allows the full electrodes to be used efficiently. Similarly, in the case where the electrode group includes a planar metal electrode mentioned later, the first ion-adsorbing electrode, the second ion-adsorbing electrode and the metal electrode preferably are disposed so that they are parallel to one another when the electrode group is extended.

The first and second electrically conductive materials are materials that can adsorb and release ions reversibly. The first and second electrically conductive materials can be materials with a large specific surface area. A preferred example of the first and second electrically conductive materials is activated carbon. For instance, the first and second electrically conductive materials may be electrically conductive sheets formed by aggregating granular activated carbon. Alternatively, the first and second electrically conductive materials may be electrically conductive sheets formed by aggregating granular activated carbon and electrically conductive carbon. Alternatively, the first and second electrically conductive materials may be activated carbon blocks formed by compacting activated carbon particles. Alternatively, the first and second electrically conductive materials may be an activated carbon fiber cloth, i.e. a cloth formed of activated carbon fibers. Examples of activated carbon fiber cloths include ACC5092-10, ACC5092-15, ACC5092-20, and ACC-5092-25 made by NIPPON KYNOL Inc.

When a plurality of the first ion-adsorbing electrodes and a plurality of the second ion-adsorbing electrodes are disposed in the container, the first and second ion-adsorbing electrodes may have a structure through which ions easily pass. Such electrodes can prevent the ion concentration from being uneven in the solution. For example, when granular activated carbon is used as the electrically conductive material, it is preferred that the electrode be formed by applying granular activated carbon to a porous collector or a collector with through holes formed therein, such as punched metal. It is particularly preferred that the activated carbon fiber cloth be used in the electrodes.

The specific surface area of each of the first and second electrically conductive materials is, for example, 300 $m^2/g$ or more and preferably is 900 $m^2/g$ or more. The upper limit of the specific surface area is not particularly limited and, for example, may be 2500 $m^2/g$ or less. In this specification, the term "specific surface area" means a value measured by the BET method using nitrogen gas.

The power supply (voltage supply) generally is a direct current power supply. The power supply may be a battery, such as a dry battery, a rechargeable battery and a solar battery. Alternatively, the power supply may be an AC-DC converter that converts alternating current obtained from a power receptacle into direct current. Alternatively, the power supply may be an electric generator (e.g., hand driven generator).

The device of the present invention can reduce the hardness of drinking water with step (i) mentioned below. In step (i), a voltage is applied between the first ion-adsorbing electrode and the second ion-adsorbing electrode, with the first and second ion-adsorbing electrodes being immersed in the drinking water. In this step, the voltage (direct current voltage) is applied between the electrodes so that the first ion-adsorbing electrode serves as an anode (positive electrode), that is, so that the second ion-adsorbing electrode serves as a cathode (negative electrode). The applied voltage allows an anion in the drinking water to be adsorbed on the first electrically conductive material and allows a cation in the drinking water to be adsorbed on the second electrically conductive material. Magnesium ion and calcium ion in the drinking water are adsorbed on the second electrically conductive material by applying the voltage. As a result, the hardness of the drinking water in the container is reduced. Examples of typical anions in drinking water include sulfate ion, carbonate ion, chlorine ion, nitrate ion, etc.

In step (i), the voltage applied between the first ion-adsorbing electrode and the second ion-adsorbing electrode may be higher than 2 volts. Assuming that the electrodes have neither oxygen overvoltage nor hydrogen overvoltage and that there is no voltage drop due to resistance of the drinking water, the drinking water will be electrolyzed at a voltage of 2 volts or less. However, in reality, the oxygen overvoltage and hydrogen overvoltage of the electrodes and the voltage drop due to resistance of the drinking water exist, electrolysis of the drinking water does not occur even if a voltage higher than 2 volts is applied. The rate of the ion adsorption can be increased by applying the highest voltage in the voltage range where the electrolysis of the drinking water does not occur. The applied voltage may be higher than 3 volts, 5 volts or 10 volts as long as the effect of the water electrolysis does not cause a problem. The applied voltage generally is not more than 50 volts.

In step (i), a constant voltage may be applied between the first ion-adsorbing electrode and the second ion-adsorbing electrode. Alternatively, a voltage may be applied between the electrodes so that a constant current flows between the electrodes.

When the hardness of the drinking water is to be increased, the following step (a) is performed. First, the first ion-adsorbing electrode and the second ion-adsorbing electrode that includes the second electrically conductive material on which at least one cation selected from calcium ion and magnesium ion is adsorbed are immersed in the drinking water. Such a second ion-adsorbing electrode can be produced by the above-mentioned step (i). In that case, the drinking water processed in step (a) differs from the drinking water processed in step (i). That is, after step (i), the drinking water is replaced with new drinking water, and then step (a) is performed. An anion is adsorbed on the first electrically conductive material of the first ion-adsorbing electrode that has been subjected to step (i). Next, a voltage (direct current voltage) is applied between the first ion-adsorbing electrode and the second ion-adsorbing electrode so that the first ion-adsorbing electrode serves as a cathode (negative electrode), that is, so that the second ion-adsorbing electrode serves as an anode (positive electrode), with the first ion-adsorbing electrode and the second ion-adsorbing electrode being immersed in the drinking water. The applied voltage allows the at least one cation to be released into the drinking water, and thereby the hardness of the drinking water is increased. At this time, the anion that has been adsorbed on the first electrically conductive material is also released into the drinking water. The ions that have been adsorbed on the electrically conductive materials can also be released by short-circuiting the first ion-adsorbing electrode and the second ion-adsorbing electrode instead of applying the voltage between the electrodes in step (a).

The voltage applied in step (a) may be higher than 3 volts, 5 volts or 10 volts, as long as the effect of water electrolysis does not cause a problem. The voltage applied in step (a) generally is not more than 50 volts.

The device of the present invention generally processes the drinking water with a batch process. In an example, first, a drinking water (hard water) to be processed is put in the container. Next, the drinking water is softened by performing the above-mentioned step (i). The softened drinking water is taken out from the container and used for drinking.

The first ion-adsorbing electrode may include a first wiring that is in contact with the first electrically conductive material. The second ion-adsorbing electrode may include a second wiring that is in contact with the second electrically conductive material. In the case where the resistance of the electrically conductive materials (e.g., activated carbon) is high, the electrically conductive materials cannot adsorb ions efficiently because the electric potential varies widely in the electrically conductive materials. In such a case, it is preferred to provide wiring that is in contact with the electrically conductive materials to reduce the variation in the electric potential.

The first and second wiring may be metal wiring formed of metal, such as titanium, aluminum, tantalum and niobium, or may be a carbon wire. Such wiring may be coated with platinum.

Moreover, each of the first and second wirings may have a portion that is not in contact with the first and second electrically conductive materials and that is covered with resin or rubber. The synthetic resin and rubber preferably are water repellent. The synthetic resin may be silicone resin, for example. When the metal wiring formed of specific metal such as aluminum, tantalum, niobium and titanium is used in the anode side, an oxide layer may be formed in the surface of the metal wiring and may increase the contact resistance. Therefore, in the case where such a metal wiring is used, it is preferred that the surface of the metal wiring be covered with synthetic resin or rubber, with the metal wiring being in contact with the electrically conductive material. The synthetic resin and rubber may contain electrically conductive particles, such as carbon black. When the electrically conductive particles are used, the electrically conductive particles can increase the conductivity between the wiring and the electrically conductive material.

Step (i) allows ions to be adsorbed on the first and second electrically conductive materials. When more than a certain amount of ions is adsorbed, further ions hardly will be adsorbed. In such a case, the adsorbed ions preferably are released. For instance, in the device of the present invention, step (ii) of releasing ions may be performed after step (i) as follows. In step (ii), first, water into which the ions will be released is put in the container. Next, a voltage is applied between the first ion-adsorbing electrode and the second ion-adsorbing electrode so that the first ion-adsorbing electrode serves as a cathode (that is, so that the second ion-adsorbing electrode serves as an anode). The voltage applied in step (ii) is not limited and is, for example, a voltage that does not cause water electrolysis. The applied voltage allows the anions adsorbed by the first ion-adsorbing electrode and the cations adsorbed by the second ion-adsorbing electrode to be released into the water. The hardness of the water into which the ions have been released becomes higher. The water into which the ions have been released may be used as hard water, or may be discarded.

In the case where the same water is processed in step (i) and step (ii), the hardness of the water can be increased or reduced. In the case where a first water is processed in step (i) and a second water that is different from the first water is processed in step (ii), the hardness of the first water can be reduced and the hardness of the second water can be increased. The change in the hardness can be regulated by the time period of applying the voltage and the magnitude of the applied voltage.

The ions also can be released by short-circuiting the first ion-adsorbing electrode and the second ion-adsorbing electrode after step (i). It is believed that the anions adsorbed on the first electrically conductive material are coupled to positive charges present in the near-surface of the first electrically conductive material by Coulomb force. It is also believed that the cations adsorbed on the second electrically conductive material are coupled to negative charges present in the near-surface of the second electrically conductive material by Coulomb force. Accordingly, when the two electrodes are short-circuited so that the positive charges and the negative charges cancel each other, the ions will be released from the electrically conductive materials.

The release of the ions by short-circuiting the electrodes can be carried out with the following procedures, for example. First, a drinking water is softened by step (i). Next, the softened drinking water is taken out from the container. Next, the first ion-adsorbing electrode and the second ion-adsorbing electrode are short-circuited. The electrodes may be short-circuited by folding and bringing them into direct contact, or by wiring them. In this case, a switch for short-circuiting the electrodes may be provided in the wiring. A small amount of the drinking water remains in the container, and the ions are released into the drinking water. As a result, the first and second electrically conductive materials will be regenerated. It is preferred that the electrodes and the inside of the container be washed using washing water after performing the step of releasing ions but before performing step (i).

Unlike the conventional water softeners using ion-exchange resins, the device of the present invention does not need sodium chloride water to regenerate the device. Accordingly, the device of the present invention is easy to use during travel, etc. Moreover, unlike the conventional devices using ion-exchange resins, the device of the present invention can regenerate the electrodes in a short time.

The mechanism of adsorbing ions contained in the drinking water is the same as that seen in the electric double layer capacitor. Here, it is assumed that the first electrically conductive material and the second electrically conductive material are formed of the same material and in the same amount. In this case, the amount of electric charge of the anions adsorbed on the first electrically conductive material before oxygen gas is generated at the first ion-adsorbing electrode that serves as an anode is less than the amount of electric charge of the cations adsorbed on the second electrically conductive material before hydrogen gas is generated at the second ion-adsorbing electrode that serves as a cathode. Accordingly, when the first electrically conductive material and the second electrically conductive are formed of the same material and in the same amount, the first ion-adsorbing electrode (anode) reaches the electric potential of water electrolysis first. In order to prevent the gas from being generated only at one electrode, it is preferred that the amount of electric charge that is accumulated in the first ion-adsorbing electrode before oxygen gas is generated at the first ion-adsorbing electrode be equal to the amount of electric charge that is accumulated in the second ion-adsorbing electrode before hydrogen gas is generated at the second ion-adsorbing electrode. When the first electrically conductive material and the second electrically conductive material are formed of the same material, it is preferred that the total weight of the first electrically conductive material be 1 to 2 times (e.g., 1.1 to 2 times or 1.2 to 1.5 times) as much as the total weight of the second electrically conductive material.

When adsorption and release of ions are repeated using the electrically conductive materials, a difference may arise between the amount of electric charge of the anions adsorbed on the first electrically conductive material and the amount of electric charge of the cations adsorbed on the second electrically conductive material. In such a case, a voltage may be applied until the water electrolysis occurs at one of the electrodes.

The electrode group used in the device of the present invention may include a metal electrode. The metal electrode can be used as the counter electrode that is paired with the ion-adsorbing electrode. Examples of metal electrodes include an electrode whose surface is coated with metal (e.g., Pt) that facilitates water electrolysis, e.g., a Pt electrode or an electrode formed of Ti coated with Pt. The metal electrode may be an electrode having path through which liquid can pass. For instance, the metal electrode may be a planar electrode in which through-holes are formed. Such an electrode can prevent ion flow from being restricted by the electrode. Examples of planar electrodes in which through-holes are formed include a mesh electrode and a sheet-like electrode in which through-holes are formed.

The metal electrode may be, but need not be, disposed between the first ion-adsorbing electrode and the second ion-adsorbing electrode. When the metal electrode is disposed between the first ion-adsorbing electrode and the second ion-adsorbing electrode, the metal electrode preferably is a planar electrode in which through-holes are formed.

After step (i), the imbalance between the amounts of ions adsorbed on the first and second electrically conductive materials can be corrected by applying a voltage between the metal electrode and one of the electrodes selected from the first and second ion-adsorbing electrodes, with the electrodes being immersed in water in the container. In this step, the voltage is applied so that water electrolysis occurs at the surface of the metal electrode.

[pH Regulation and Disinfection]

In the device of the present invention, a voltage may be applied between the metal electrode and at least one electrode selected from the first and second ion-adsorbing electrodes to electrolyze water at the surface of the metal electrode, and thereby the pH of the drinking water is regulated. Moreover, in the device of the present invention, the drinking water may be disinfected by applying a voltage between the metal electrode and at least one electrode selected from the first and second ion-adsorbing electrodes. When performing pH regulation and/or disinfection, the device of the present invention may include a pH meter for measuring the pH of the drinking water.

When a direct current voltage is applied between the ion-adsorbing electrode and the metal electrode so that the ion-adsorbing electrode serves as an anode (that is, so that the metal electrode serves as a cathode), anions in the drinking water are adsorbed on the electrically conductive material of the ion-adsorbing electrode. Meanwhile, hydroxide ion ($OH^-$) and hydrogen gas are generated at the surface of the metal electrode. As a result, the drinking water becomes alkaline. When a direct current voltage is applied between the ion-adsorbing electrode and the metal electrode so that the ion-adsorbing electrode serves as a cathode (that is, so that the metal electrode serves as an anode), cations in the drinking water are adsorbed on the electrically conductive material of the ion-adsorbing electrode. Meanwhile, hydrogen ion ($H^+$) and oxygen gas are generated at the surface of the metal electrode. As a result, the drinking water becomes acidic. Using these methods, the pH of the drinking water can be adjusted in a range suitable to drink. For example, the pH of the drinking water can be adjusted in the range of 4.5 to 9.5 (for example, in the range of 6 to 8).

Using above-mentioned methods, the pH of the drinking water also can be adjusted to be not more than 4 or not less than 10. The drinking water can be disinfected by changing the pH of the drinking water to acidic and/or alkaline. After disinfection, the pH of the drinking water may be regulated again so that the pH of the drinking water will be in a range suitable to drink. A disinfection method performed in the device of the present invention is described below. The disinfection method includes following steps (I) and (II).

In step (I), the pH of the drinking water is changed to not more than 4 or not less than 10 by applying a direct current voltage between the ion-adsorbing electrode and the metal electrode in the drinking water. Next, the pH of the drinking water is changed to be in the range of 4.5 to 9.5 (for example, in the range of 6 to 8) in step (II) by applying a direct current voltage between the ion-adsorbing electrode and the metal electrode in the drinking water that has been processed in step (I).

The first ion-adsorbing electrode and/or the second ion-adsorbing electrode can be used as the ion-adsorbing electrode used in step (I). Moreover, the first ion-adsorbing electrode and/or the second ion-adsorbing electrode can be used as the ion-adsorbing electrode used in step (II).

In an example, the ion-adsorbing electrodes used in step (I) are different from that used in step (II). In the case where the different ion-adsorbing electrodes are used in step (I) and in step (II), the hardness of the drinking water can be reduced while disinfecting the drinking water. For example, in step (I), a voltage is applied between the first ion-adsorbing electrode and the metal electrode so that the first ion-adsorbing electrode serves as an anode. This step allows anions in the drinking water to be decreased and allows the drinking water to be alkaline. Next, in step (II), a voltage is applied between the second ion-adsorbing electrode and the metal electrode so that the second ion-adsorbing electrode serves as a cathode. This step allows cations in the drinking water to be decreased and allows the drinking water to be neutralized. Thus, the hardness of the drinking water can be reduced while disinfecting the drinking water. This is the same when the drinking water is changed to be acidic in step (I) and the drinking water is changed to be neutral in step (II). On the other hand, in the case where the same ion-adsorbing electrode is used in step (I) and in step (II), there is no big change in the concentration of ions in the drinking water before and after disinfection.

Step (x) of applying a direct current voltage between the ion-adsorbing electrode and the metal electrode to allow the pH of the drinking water to change by 6 or more to be not more than 4 or not less than 10 may be further performed between step (I) and step (II). In an example, the pH of the drinking water is changed to be not more than 4 in step (I), and is changed to be not less than 10 in step (x), and is changed to be in the range of 4.5 to 9.5 (for example, in the range of 6 to 8) in step (II). In another example, the pH of the drinking water is changed to be not less than 10 in step (I), and is changed to be not more than 4 in step (x), and is changed to be in the range of 4.5 to 9.5 (for example, in the range of 6 to 8) in step (II).

In an example, the ion-adsorbing electrode used in step (I) and step (II) is different from the ion-adsorbing electrode used in step (x). For example, in step (I) and step (II), a direct current voltage is applied between the first ion-adsorbing electrode and the metal electrode so that the first ion-adsorbing electrode serves as an anode. This step allows anions in the drinking water to be decreased and allows the pH of the drinking water to be increased. On the other hand, in step (x), a direct current voltage is applied between the second ion-adsorbing electrode and the metal electrode so that the second ion-adsorbing electrode serves as a cathode. This step allows cations in the drinking water to be decreased and allows the pH of the drinking water to be reduced. Thus, the hardness of the drinking water can be reduced while disinfecting the drinking water. This is the same when the pH of the drinking water is reduced in step (I) and step (II) and the pH of the drinking water is increased in step (x).

In the case where the ion-adsorbing electrode used in step (I) and step (II) is the same as the ion-adsorbing electrode used in step (x), there is no big change in the concentration of ions in the drinking water before and after disinfection.

Step (x) allows the drinking water to be acidic and alkaline. Accordingly, both bacteria vulnerable to acid and bacteria vulnerable to alkali can be decreased. The first ion-adsorbing electrode and/or the second ion-adsorbing electrode can be used as the ion-adsorbing electrode used in step (x).

In step (I), step (II), and step (x), a voltage that allows the drinking water to be electrolyzed at the surface of the metal electrode is applied between the electrodes. The voltage at which the drinking water is electrolyzed depends on the ion concentration of the drinking water and the type of the metal electrode. In an example, a voltage in the range of 5 volts to 30 volts is applied.

It is believed that the disinfection in step (I) and step (x) is attributed to effects of both disinfection achieved by changing the pH to acidic or alkaline and disinfection at the surface of the metal electrode achieved by changing the electric potential of the metal electrode.

The validity of the above-mentioned disinfection method was checked using the sodium chloride aqueous solution in which bacteria were intentionally mixed. An activated carbon fiber cloth (ACC-5092-10 made by NIPPON KYNOL, Inc., area density: 200 g/m$^2$, thickness: 0.53 mm, specific surface area: 1100 m$^2$/g) was used as the electrically conductive material of the ion-adsorbing electrode. A planar electrode in which titanium wires coated with platinum were arranged in stripes was used as the metal electrode.

First, 120 ml of a test liquid was put in the container. A neutral sodium chloride aqueous solution (sodium chloride concentration: 0.78 g/liter) containing bacteria was used as the test liquid. Next, a voltage was applied between the ion-adsorbing electrode and the metal electrode so that the ion-adsorbing electrode served as an anode. The voltage was applied for 15 minutes so that 200 mA of electric current flowed between the electrodes. This applied voltage changed the pH of the test liquid to 12. The test liquid was allowed to stand still for 15 minutes after applying the voltage. After the passage of 15 minutes after applying the voltage, a voltage began to be applied between the ion-adsorbing electrode and the metal electrode so that the ion-adsorbing electrode served as a cathode. The voltage was applied for 30 minutes so that 200 mA of electric current flowed between the electrodes. This applied voltage changed the pH of the test liquid to 3. The test liquid was allowed to stand still for 15 minutes after applying the voltage.

After the passage of a predetermined time after the start of the experiment, part of the test liquid was taken out to measure the number of viable bacteria in it. The test liquid was added to a SCDLP medium and cultivated, and then the number of viable bacteria was measured. As a control test, the number of viable bacteria in a test liquid that has not been disinfected was measured at the start of the test and 75 minutes after the start of the test. Table 1 shows the relationship between the elapsed time from the start of the test and the pH and number of viable bacteria in the test liquid.

TABLE 1

| | | Number of viable bacteria (counts/ml) | | | | | | |
|---|---|---|---|---|---|---|---|---|
| Bacteria | Disinfected? | Initial neutral | 15 min later pH 12 | 20 min later pH 12 | 30 min later pH 12 | 60 min later pH 3 | 65 min later pH 3 | 75 min later pH 3 |
| *Bacillus subtilis* (spore) | Yes | $5.6 \times 10^5$ | $4.3 \times 10^5$ | $4.3 \times 10^5$ | $5.0 \times 10^5$ | $5.2 \times 10^3$ | $5.7 \times 10^3$ | $4.5 \times 10^3$ |
| | No | $5.6 \times 10^5$ | — | — | — | — | — | $6.2 \times 10^5$ |
| *Escherichia* | Yes | $8.3 \times 10^5$ | $1.2 \times 10^5$ | $6.4 \times 10^4$ | $2.7 \times 10^4$ | <10 | <10 | <10 |

TABLE 1-continued

| Bacteria | Disinfected? | Initial neutral | 15 min later pH 12 | 20 min later pH 12 | 30 min later pH 12 | 60 min later pH 3 | 65 min later pH 3 | 75 min later pH 3 |
|---|---|---|---|---|---|---|---|---|
| coli | No | $8.3 \times 10^5$ | — | — | — | — | — | $9.7 \times 10^5$ |
| Staphylococcus | Yes | $4.5 \times 10^5$ | $1.7 \times 10^5$ | $2.0 \times 10^5$ | $3.3 \times 10^5$ | <10 | <10 | <10 |
| aureuses | No | $4.5 \times 10^5$ | — | — | — | — | — | $5.1 \times 10^5$ |
| Candida | Yes | $4.7 \times 10^5$ | $9.1 \times 10^2$ | $5.2 \times 10^2$ | $4.6 \times 10^2$ | <10 | <10 | <10 |
|  | No | $4.7 \times 10^5$ | — | — | — | — | — | $2.9 \times 10^5$ |
| Aspergillus | Yes | $5.0 \times 10^5$ | $2.7 \times 10^4$ | $9.1 \times 10^3$ | $7.8 \times 10^3$ | $8.4 \times 10^3$ | $8.6 \times 10^3$ | $1.0 \times 10^4$ |
| niger | No | $5.0 \times 10^5$ | — | — | — | — | — | $5.4 \times 10^5$ |
| Cladosporium | Yes | $5.5 \times 10^5$ | $9.8 \times 10^2$ | $2.7 \times 10^2$ | $1.6 \times 10^2$ | <10 | <10 | <10 |
|  | No | $5.5 \times 10^5$ | — | — | — | — | — | $3.8 \times 10^5$ |

As shown in Table 1, although the number of *Bacillus subtilis* showed little change after alkali treatment, it was decreased to less than 1/100 after acid treatment. The number of *Escherichia coli* was decreased to less than 1/10 after alkali treatment, and was decreased to less than 1/10,000 after acid treatment. Although the number of *Staphylococcus aureuses* showed little change after alkali treatment, it was decreased to less than 1/10,000 after acid treatment. The number of *Candida* was decreased to less than 1/1000 after alkali treatment, and was decreased to less than 1/10,000 after acid treatment. Although the number of *Aspergillus niger* was decreased to less than 1/50 after alkali treatment, it showed little change in acid treatment. The number of *Cladosporium* was decreased to less than 1/1000 after alkali treatment, and was decreased to less than 1/10,000 after acid treatment. As mentioned above, it was confirmed that disinfection can be achieved using the ion-adsorbing electrode and the metal electrode.

In the device of the present invention, each of the first and second electrically conductive materials may be covered with a protective cloth.

The device of the present invention may include a display screen that displays the resistance of the drinking water in the container or displays the drinking water hardness that is estimated from the resistance. As the adsorption of ions in the drinking water occurs in step (i), the resistance of the drinking water will rise in accordance with the adsorption. Accordingly, the ion concentration change in the drinking water can be measured by monitoring the resistance of the drinking water. The resistance in the drinking water can be estimated from the voltage applied between electrodes contained in the electrode group (e.g., between the first ion-adsorbing electrode and the second ion-adsorbing electrode) and the electric current that flows between the electrodes. In this case, the device of the present invention further includes an ammeter for measuring the electric current that flows between the electrodes contained in the electrode group (e.g., between the first ion-adsorbing electrode and the second ion-adsorbing electrode).

Display devices, such as liquid crystal panels, can be used as the display screen. The display screen displays the resistance or the estimated hardness of the drinking water. Those values are calculated by the controller connected to the power supply and the ammeter. The hardness can be estimated from, for example, the measured resistance using the relationship between the resistance and hardness of every type of drinking water. The relationship is measured in advance and is recorded in a memory in the controller.

In one of the simplest examples of the device according to the present invention, a user determines a time period to apply a voltage between the electrodes. For example, a user may determine a time period to apply a voltage according to a time period to apply a voltage that is recommended in accordance with water hardness in travel destinations. Another example of the device of the present invention may include a controller for regulating the voltage applied between the electrodes. Such a controller includes a memory unit (storage device) in which a program for performing at least one step mentioned above (e.g., steps (i), (ii), (a), (I), (II), and (x)) is recorded, and the controller further includes a processor that executes the program. Examples of processors include CPUs. Examples of controllers include LSIs. The controller may control magnitude of the voltage and time period to apply voltage.

The controller is connected to the power supply. When the device includes instruments for measuring the properties of the drinking water, these instruments also are connected to the controller. Examples of these instruments include ammeters and voltmeters for measuring ion concentration, pH meters, etc. Moreover, the device of the present invention may include a timer for controlling a time period to apply voltage.

Moreover, the device of the present invention may include a filter that is used in conventional drinking water purifiers if desired. For example, a known activated carbon filter may be incorporated in the device of the present invention.

Embodiment 1

Hereinafter, the device of the present invention will be described by way of example with reference to the drawings. FIG. 1 schematically shows a device for regulating water hardness in Embodiment 1.

A device 100 shown in FIG. 1 includes a container 10, a power supply 13, a DC ammeter 14, a controller 15, a display screen 16, and an electrode group 20. The electrode group 20 includes a plurality of first ion-adsorbing electrodes 21 and a plurality of second ion-adsorbing electrodes 22. The ion-adsorbing electrodes 21 and 22 are disposed in the container 10. Drinking water 25 is put in the container 10. The ion-adsorbing electrodes 21 and 22 are immersed in the drinking water 25.

The power supply 13 is an AC-DC converter that converts alternating current obtained from a power receptacle to direct current. The DC ammeter 14 measures the electric current that flows between the ion-adsorbing electrodes 21 and the ion-adsorbing electrodes 22. The controller 15 includes an input unit for giving instructions, such as ON/OFF of the device. The controller 15 controls the power supply 13 to apply a voltage to the electrode group 20 according to inputted information. Moreover, the controller 15 calculates a predictive hardness according to the output from the DC ammeter 14, and outputs it to the display screen 16. The display screen 16 displays the predictive hardness.

Figure 2:
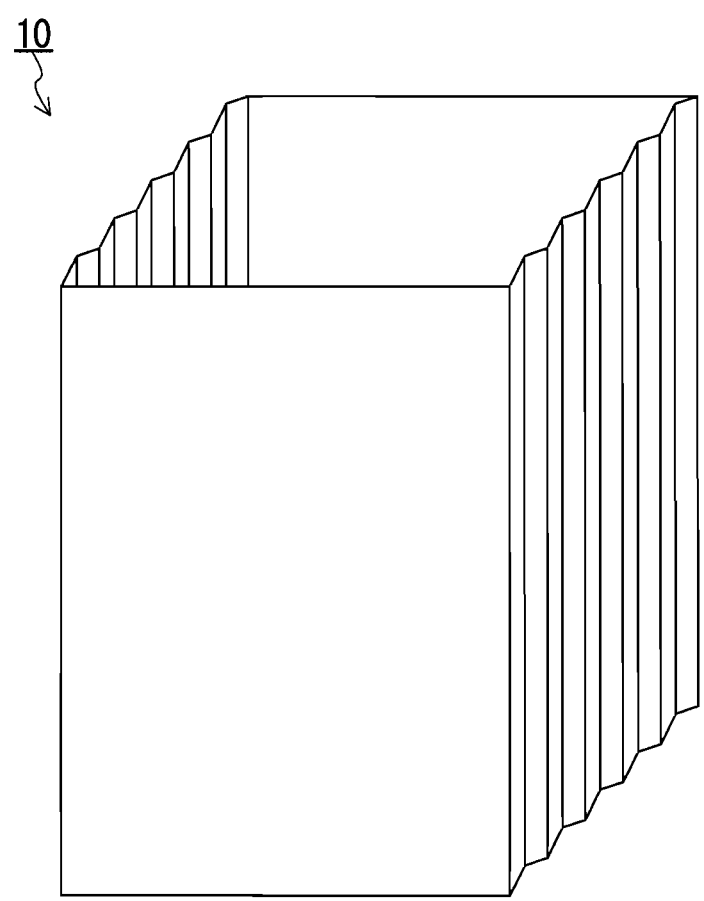
FIG. 2 is a perspective view showing an example of a container used in the device of the present invention.
Figure 3A:
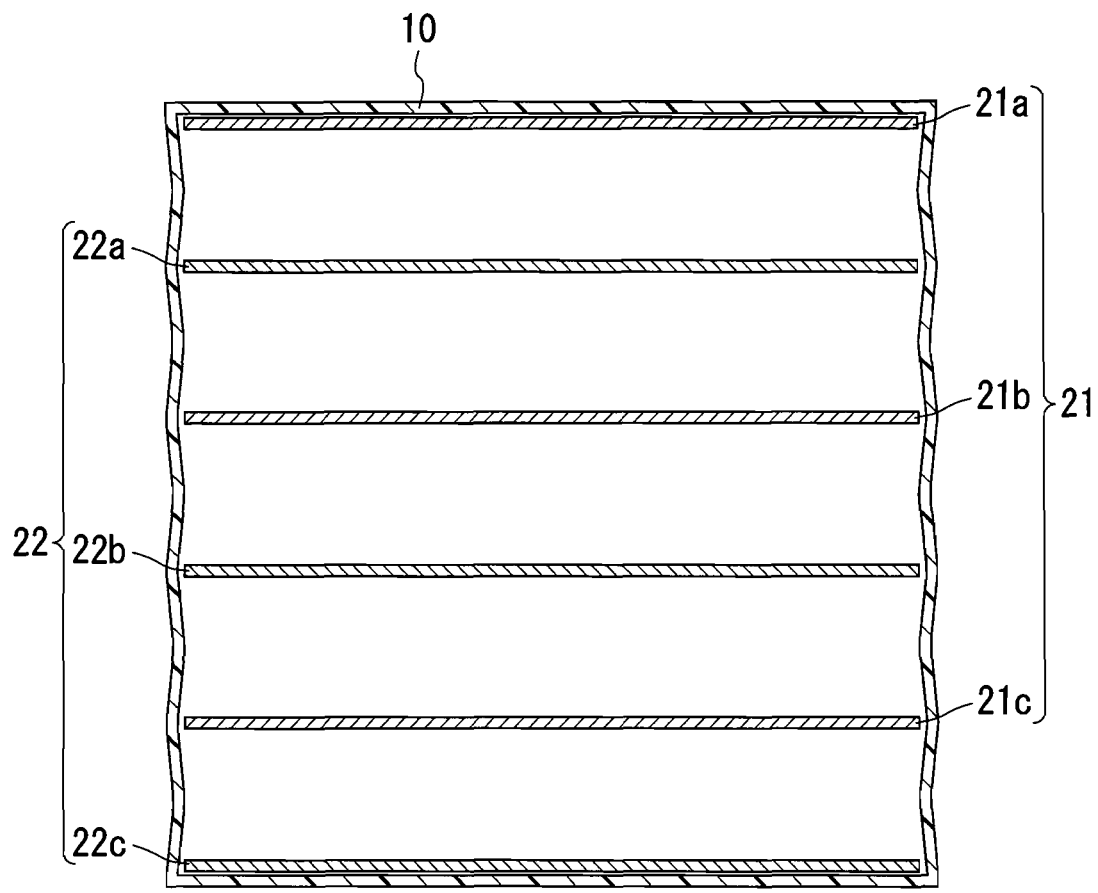
FIG. 3A is a cross-sectional view showing an example of a container used in the device of the present invention and an electrode group disposed in the container.
Figure 3B:
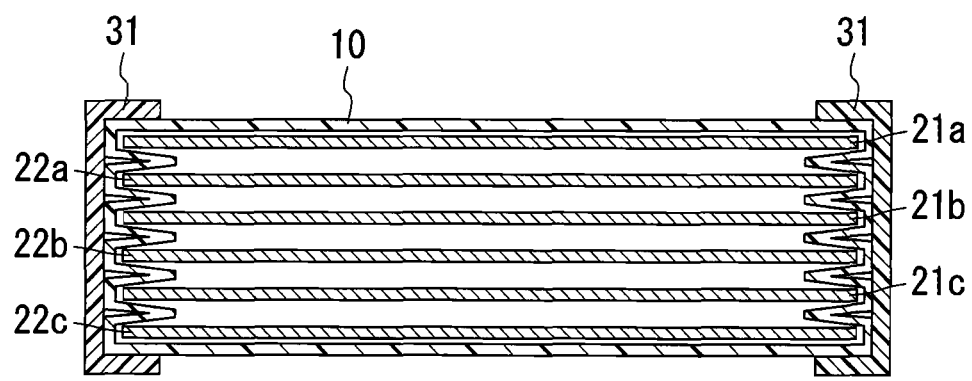
FIG. 3B is a cross-sectional view showing a state where the container and the electrode group shown in FIG. 3A are collapsed.

The container 10 is a container that can be collapsed like an accordion. FIG. 2 is a perspective view showing an example of the container 10. FIG. 3A and FIG. 3B are horizontal cross-sectional views showing an example of the container 10 and the electrodes disposed in the container 10. FIG. 3A shows a state where the container 10 is extended, and FIG. 3B shows a state where the container 10 is collapsed.

When the container 10 shown in FIG. 3A and FIG. 3B is extended, the size of the inside thereof is, for example, 10 cm in length, 10 cm in width, and 15 cm in height. The container 10 having such a size allows one liter of liquid to be processed. In the container 10, ion-adsorbing electrodes 21a to 21c and ion-adsorbing electrodes 22a to 22c are disposed. The ion-adsorbing electrodes each have a size of about 10 cm by 10 cm. When the container 10 is extended, the interval of the electrodes is about 2 cm. The interval of the electrodes in the collapsed container 10 is not limited, and the electrodes may be in contact with one another in the collapsed container 10. The collapsed container 10 may be fixed with a fastener 31 shown in FIG. 3B or may be put in a bag.

Figure 4A:
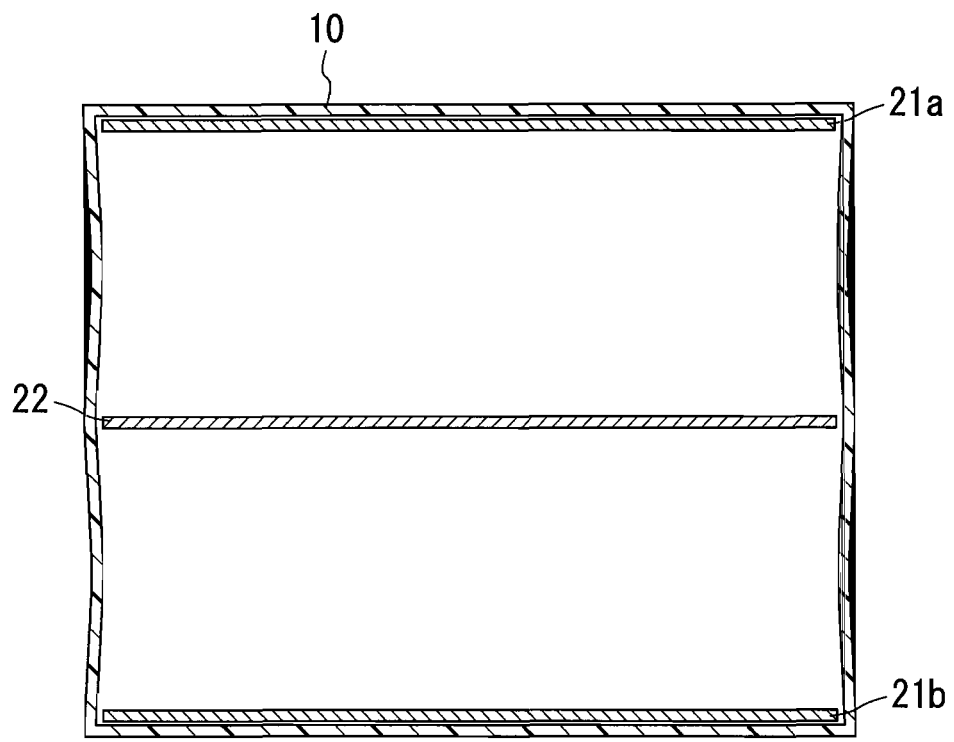
FIG. 4A is a cross-sectional view showing another example of the container used in the device of the present invention and the electrode group disposed in the container.
Figure 4B:
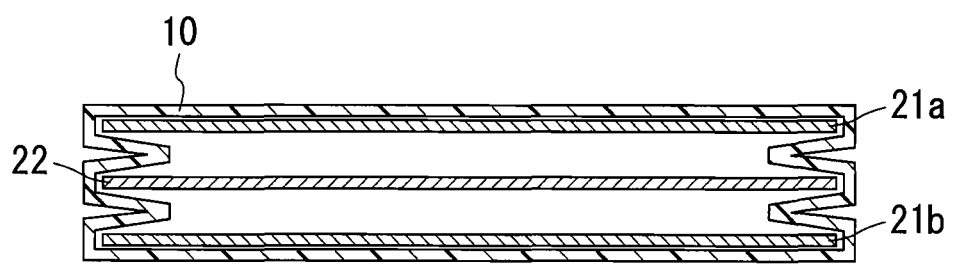
FIG. 4B is a cross-sectional view showing a state where the container and the electrode group shown in FIG. 4A are collapsed.

FIG. 4A and FIG. 4B are horizontal cross-sectional views showing another example of the container 10 and the electrodes disposed in the container 10. FIG. 4A shows a state where the container 10 is extended, and FIG. 4B shows a state where the container 10 is collapsed. When the container 10 shown in FIG. 4 is extended, the size of the inside thereof is, for example, 8 cm in length, 10 cm in width, and 15 cm in height. The container 10 having such a size allows 0.8 liters of liquid to be processed. The ion-adsorbing electrodes 21a, 21b and the ion-adsorbing electrodes 22 are disposed in the container 10. The ion-adsorbing electrodes each have a size of about 10 cm by 10 cm. When the container 10 is extended, the interval of the electrodes is about 4 cm. The interval of the electrode in the collapsed container 10 is not limited, and the electrodes may be in contact with one another in the collapsed container 10. The electrode group 20 is collapsed when the container 10 is collapsed.

Figure 5A:
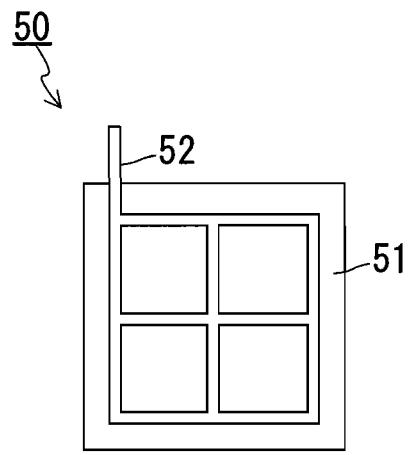
FIG. 5A shows an example of an ion-adsorbing electrode used in the device of the present invention.
Figure 5B:
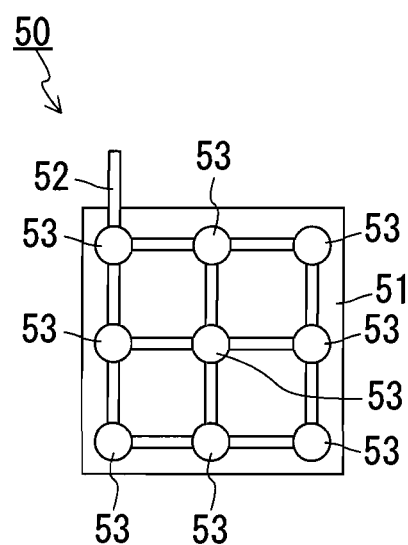
FIG. 5B shows another example of the ion-adsorbing electrode used in the device of the present invention.

An example of the ion-adsorbing electrodes 21 and 22 is shown in FIG. 5A. An ion-adsorbing electrode 50 in FIG. 5A includes an activated carbon fiber cloth 51 and wiring 52 disposed on the surface of the activated carbon fiber cloth 51. Part or all of the wiring 52 may be covered with a water-repellent conductive resin 53 as shown in FIG. 5B.

Figure 6A:
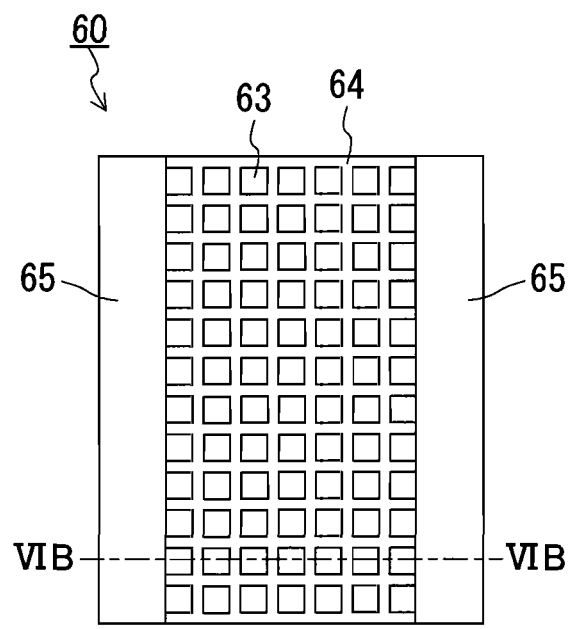
FIG. 6A is a front view showing still another example of the ion-adsorbing electrode used in the device of the present invention.
Figure 6B:
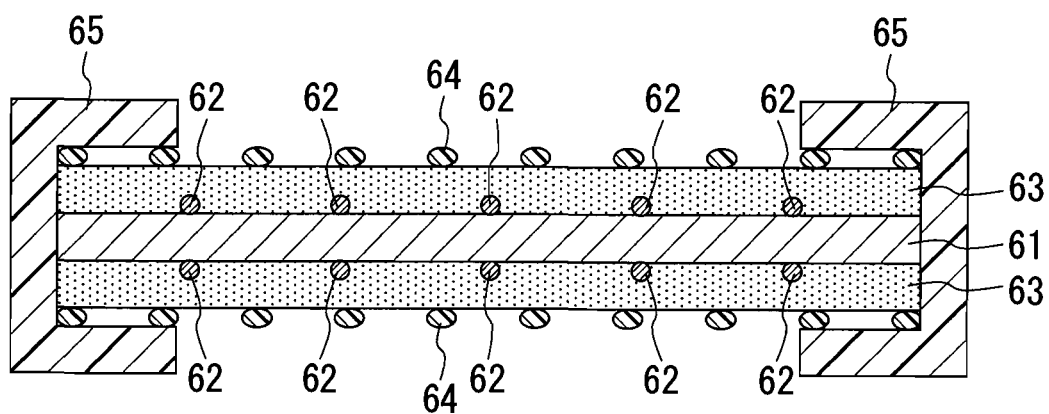
FIG. 6B is a cross-sectional view of the ion-adsorbing electrode shown in FIG. 6A.

FIG. 6A shows another example of the ion-adsorbing electrodes 21 and 22. FIG. 6B shows a cross-sectional view taken along with the line VIB-VIB in FIG. 6A.

An ion-adsorbing electrode 60 shown in FIG. 6 includes an activated carbon fiber cloth 61, wiring 62, protective cloths 63, fastening sheets 64, and fasteners 65. The activated carbon fiber cloth 61 is in contact with the wiring 62. The wiring 62 is covered with silicone resin (not shown) containing carbon black. The protective cloth 63 is a cloth that prevents the activated carbon fiber cloth 61 from wearing out and that prevents waste fibers generated due to the wearing out of the activated carbon fiber cloth 61 from being released into the drinking water. The protective cloth 63 allows liquid to pass through but blocks waste fibers. Cloth made of, for example, synthetic fibers (e.g., polyester), cotton, hemp, etc. can be used as the protective cloth 63.

The fastening sheets 64 are mesh-like sheets and allow liquid to pass through freely. The material of the fastening sheets 64 is not particularly limited. The fastening sheets 64 may be made of, for example, plastic or metal coated with resin. The fasteners 65 fix the fastening sheets 64. The activated carbon fiber cloth 61 and the protective cloths 63 are fixed by the fastening sheets 64 and the fasteners 65.

The ion-adsorbing electrodes 21 and 22 are formed of an activated carbon fiber cloth. When the same type of the activated carbon fiber cloth is used in the ion-adsorbing electrodes 21 and 22, the total weight of the activated carbon fiber cloth used in the ion-adsorbing electrode 21 that serves as an anode (positive electrode) is preferably 1 to 2 times (e.g., 1.1 to 2 times or 1.2 to 1.5 times) the total weight of the activated carbon fiber cloth used in the ion-adsorbing electrode 22 that serves as a cathode (negative electrode).

With regard to the case where the same type of the activated carbon fiber cloth is used in the ion-adsorbing electrodes 21 and 22, the amount of electric charge required to start electrolysis from the rest potential and the amount of ions that is adsorbed to start electrolysis from the rest potential were measured in experiments. In the experiments, ACC5092-10 and ACC5092-25 made by NIPPON KYNOL, Inc. were used as the activated carbon fiber cloth. Table 2 shows the measurement results. The amount of ions shown in Table 2 is an amount calculated on the assumption that all ions in the liquid are monovalent.

TABLE 2

| Activated carbon cloth | Electrode | Amount of electric charge required to start electrolysis from the rest potential [A · sec/cm$^2$] | Amount of ions adsorbed to start electrolysis from the rest potential [mol/cm$^2$] |
|---|---|---|---|
| ACC5092-25 | Anode | 2.52 | $2.68 \times 10^{-5}$ |
|  | Cathode | 3.50 | $3.62 \times 10^{-5}$ |
| ACC5092-10 | Anode | 3.37 | $3.49 \times 10^{-5}$ |
|  | Cathode | 4.39 | $4.55 \times 10^{-5}$ |

Table 2 demonstrates that the total weight of the activated carbon fiber cloth in the anode should be about 1.3 to 1.35 times the total weight of the activated carbon fiber cloth in the cathode in order to make the amount of ions that is adsorbed by the anode before gas is generated at the anode be almost equal to the amount of ions that is adsorbed by the cathode before gas is generated at the cathode. The total weight of the activated carbon fiber cloth in the anode may be about 1.2 to 1.5 times the total weight of the activated carbon fiber cloth in the cathode for practical purposes.

Examples of preferred structures in consideration of the balance of the anode and the cathode include the following structures. In the first structure, the number of the ion-adsorbing electrodes 21 (anode) is greater than the number of the ion-adsorbing electrode(s) 22 (cathode). In the second structure, the amount of the activated carbon fiber cloth that constitutes the ion-adsorbing electrode(s) 21 is greater than the amount of the activated carbon fiber cloth that constitutes the ion-adsorbing electrode(s) 22. For example, in the structure shown in FIG. 4A, each of the ion-adsorbing electrodes 21a and 21b may be composed of two sheets of the activated carbon fiber cloth, and the ion-adsorbing electrode 22 may be composed of three sheets of the activated carbon fiber cloth (i.e., anode cathode=4:3 in this structure). In the third structure, the anode includes the activated carbon fiber cloth whose ion adsorption capability is higher than that of the activated carbon fiber cloth used in the cathode. These structures can be combined freely.

Embodiment 2

Figure 7:
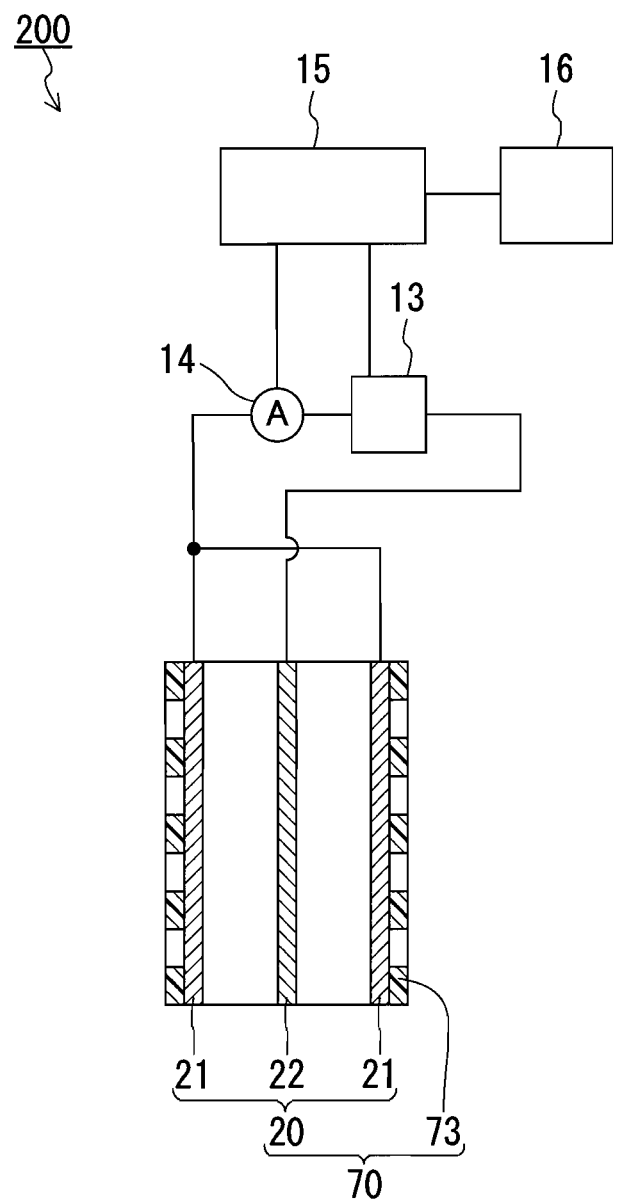
FIG. 7 schematically shows another example of the device of the present invention.

In Embodiment 2, the device for regulating water hardness that does not include a container is described by way of example. FIG. 7 shows a device for regulating water hardness in Embodiment 2. A device 200 shown in FIG. 7 includes the power supply 13, the DC ammeter 14, the controller 15, the display screen 16, and an electrode group 70. The electrode group 70 includes the ion-adsorbing electrodes 21, 22 and a support member 73.

Figure 8:
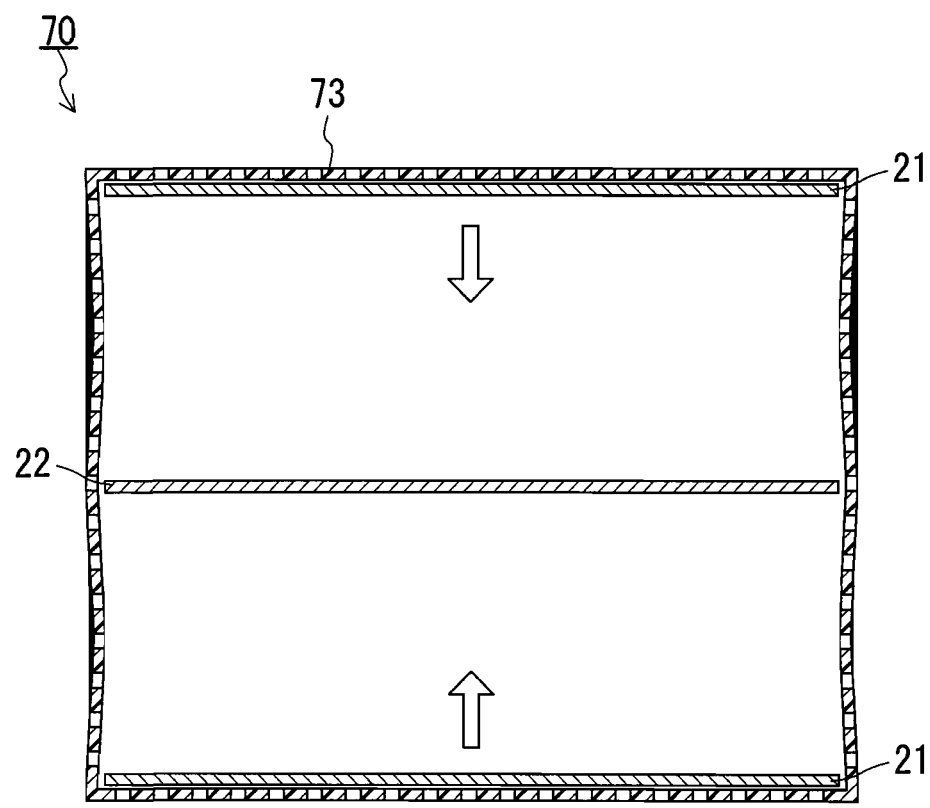
FIG. 8 is a cross-sectional view showing the electrode group in the device shown in FIG. 7.

The ion-adsorbing electrodes 21 and 22 are supported by the support member 73. The support member 73 is a sheet that allows liquid to pass through. FIG. 8 is a cross-sectional view showing the electrode group 70. FIG. 8 shows a state where the electrode group 70 is extended.

The support member 73 can be collapsed like an accordion like the container 10. The support member 73 can be a mesh plastic sheet, for example. The electrode group 70 is collapsed when the support member 73 is collapsed in the directions indicated by the arrows in FIG. 8.

The device 200 allows the hardness of drinking water in various containers to be regulated. Specifically, the electrode group 70 is immersed in drinking water in a container, and then a voltage is applied between the ion-adsorbing electrodes 21 and the ion-adsorbing electrode 22. Thus, the hardness of the drinking water can be regulated as in the case where the device 100 is used.

Figure 9A:
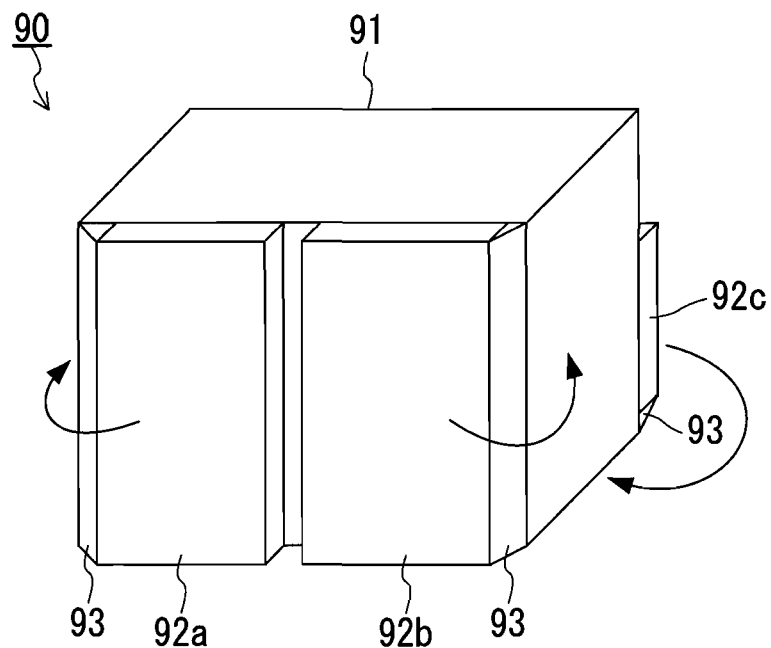
FIG. 9A is a perspective view showing an example of the container used in the device of the present invention.

The device 200 may further include a collapsible container. FIG. 9A is a perspective view showing an example of such a container. A container 90 shown in FIG. 9A includes a container 91, boards 92a to 92c for fixing, connecting components 93 that connect the container 91 and the rigid boards 92a to 92c. The container 91 is formed of a waterproof sheet and the upper part thereof is open. The boards 92a and 92b are for fixing the side surfaces of the container 91. The board 92c is for fixing the bottom of the container 91. A side of each of the boards 92a to 92c is fixed to the sides of the container 91 by the connecting members 93, and the boards 92a to 92c can rotate around these sides in the directions indicated by the arrows in FIG. 9A.

Figure 9B:
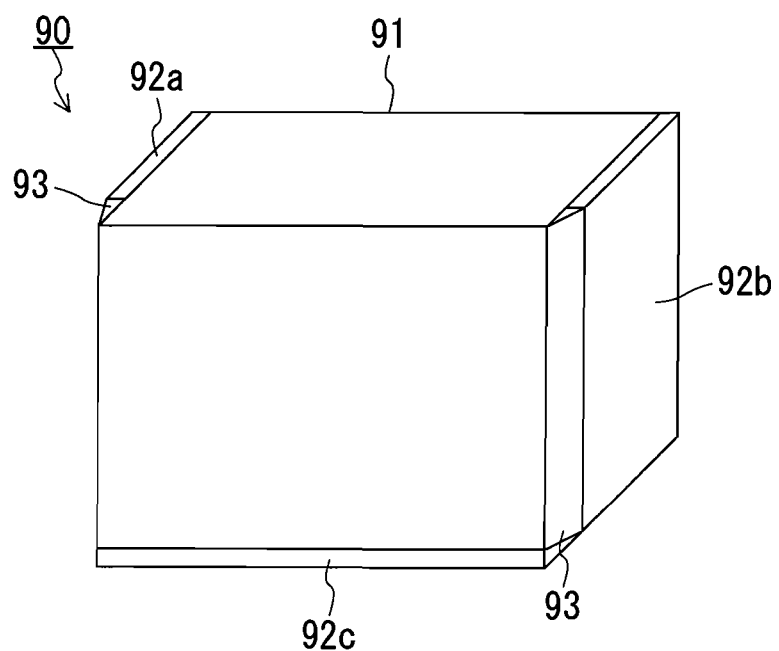
FIG. 9B is a perspective view showing the container shown in FIG. 9A, which is in use.

In the state shown in FIG. 9A, the container 91 can be collapsed in the direction where the boards 92a and 92b move closer to the board 92c. In the state shown in FIG. 9B, the boards 92a and 92b are fixed to the side surfaces of the container 91, and the board 92c is fixed to the bottom of the container 91. The boards 92a to 92c are fixed to the container 91 with fasteners (not shown), such as hook-and-Loop fasteners and hooks. In the state shown in FIG. 9B, the container 91 is held in the extended state.

Embodiment 3

In Embodiment 3, a device including the metal electrode is described. Since the device of Embodiment 3 is the same as the device of Embodiment 1 except for including the metal electrode, a repetitive description thereof is omitted.

Figure 10:
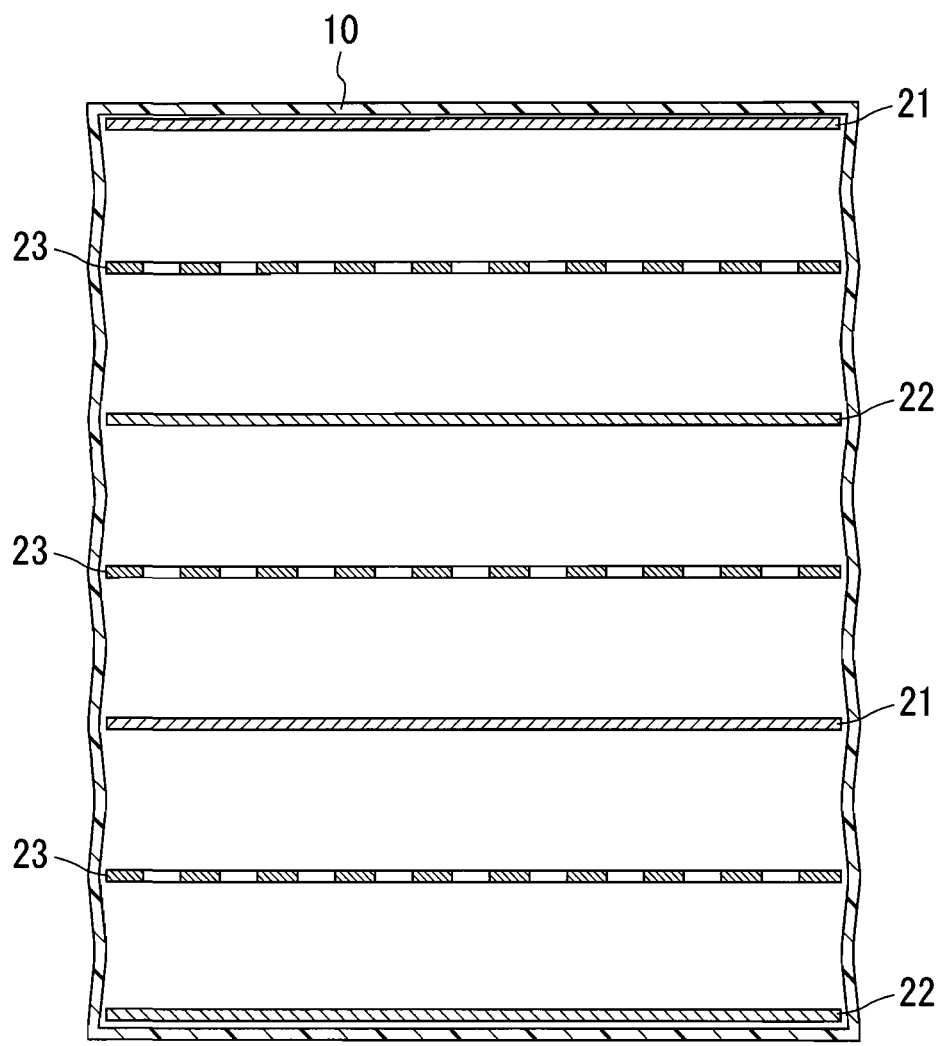
FIG. 10 is a cross-sectional view showing an arrangement of the electrodes in an example of the device of the present invention.

FIG. 10 shows an electrode arrangement of the device of Embodiment 3. The device shown in FIG. 10 includes a plurality of the first ion-adsorbing electrodes 21, a plurality of the second ion-adsorbing electrodes 22, and metal electrodes 23. These electrodes are connected to the power supply (the power supply 13 used in the device 100). The metal electrodes 23 each are disposed between the first ion-adsorbing electrodes 21 and the second ion-adsorbing electrodes 22. The first ion-adsorbing electrodes 21, the second ion-adsorbing electrodes 22, and the metal electrodes 23 are planar electrodes, and they are arranged parallel to one another. This electrode group also can be collapsed as that shown in FIG. 3B.

Figure 11:
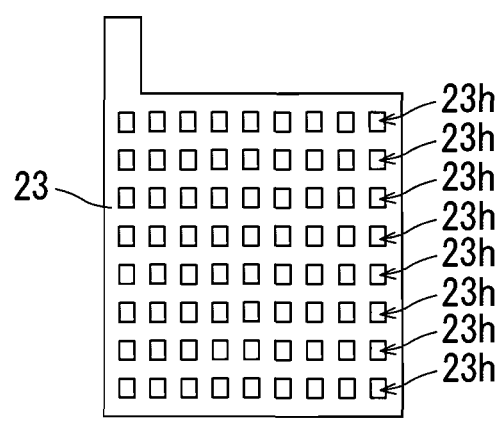
FIG. 11 shows an example of a metal electrode.

FIG. 11 shows a front view of the metal electrode 23. The metal electrode 23 is a planar electrode in which through-holes 23h are formed.

Although the above description refers to the case where the hardness of drinking water is regulated, the present invention can also be used to regulate the hardness of water other than drinking water. That is, the present invention can also be applied to the method and device that regulate the hardness of water. In this case, the word "drinking water" in the above description can be replaced with "water."

The present invention can be applied to other embodiments unless the present invention departs from its intention and essential features. The embodiments disclosed in this specification are explanatory in all senses and do not limit the present invention. The scope of the present invention is represented by accompanying claims, and encompasses all modifications which have a meaning and scope equivalent to the claims.

INDUSTRIAL APPLICABILITY

The present invention can be applied to devices that regulate water hardness, e.g., devices for softening drinking water. The device of the present invention can soften commercially available mineral water, tap water, spring water, etc.

The invention claimed is:

1. A portable device for regulating hardness of drinking water, the portable device comprising:
   a collapsible electrode group including first and second ion-adsorbing electrodes; and
   a power supply, wherein
   the first ion-adsorbing electrode includes a first electrically conductive material that is capable of adsorbing ions,
   the second ion-adsorbing electrode includes a second electrically conductive material that is capable of adsorbing ions,
   a voltage is applied between the electrodes in the electrode group, with the electrode group being immersed in the drinking water, to regulate an amount of ions adsorbed on the first and second electrically conductive materials, and thereby the hardness of the drinking water is regulated, and
   the electrode group further includes a metal electrode, and the voltage is applied between the metal electrode and at least one electrode selected from the first and second ion-adsorbing electrodes to electrolyze water at the surface of the metal electrode, and thereby a pH of the drinking water is regulated.

2. The portable device for regulating water hardness according to claim 1, wherein
   the drinking water is disinfected by regulating the pH of the drinking water.

3. The portable device for regulating water hardness according to claim 2, wherein
   the metal electrode is disposed between the first ion-adsorbing electrode and the second ion-adsorbing electrode, and the metal electrode is a planar electrode in which through-holes are formed.

4. The portable device for regulating water hardness according to claim 1, wherein the voltage is applied between the first ion-adsorbing electrode and the second ion-adsorbing electrode, with the first and second ion-adsorbing electrodes being immersed in the drinking water, to regulate the amount of the ions adsorbed on the first and second electrically conductive materials, and thereby the hardness of the drinking water is regulated.

5. The portable device for regulating water hardness according to claim 4, further comprising an ammeter for measuring electric current that flows between the first ion-adsorbing electrode and the second ion-adsorbing electrode.

6. The portable device for regulating water hardness according to claim 4, wherein the voltage is applied between the first ion-adsorbing electrode and the second ion-adsorbing electrode so that the first ion-adsorbing electrode serves as an anode, with the first and second ion-adsorbing electrodes being immersed in the drinking water, to allow an anion in the drinking water to be adsorbed on the first electrically conductive material and to allow a cation in the drinking water to be adsorbed on the second electrically conductive material, and thereby the hardness of the drinking water is reduced.

7. The portable device for regulating water hardness according to claim 6, wherein the voltage is higher than 2 volts.

8. The portable device for regulating water hardness according to claim 1, wherein the first and second electrically conductive materials are activated carbon.

9. The portable device for regulating water hardness according to claim 1, wherein
each of the first and second ion-adsorbing electrodes is a planar electrode, and
the first and second ion-adsorbing electrodes are disposed so that the first ion-adsorbing electrode and the second ion-adsorbing electrode are parallel to each other when the electrode group is extended.

10. The portable device for regulating water hardness according to claim 1, wherein
the first ion-adsorbing electrode includes a first wiring that is in contact with the first electrically conductive material, and
the second ion-adsorbing electrode includes a second wiring that is in contact with the second electrically conductive material.

11. The portable device for regulating water hardness according to claim 10, wherein each of the first and second wirings has a portion that is not in contact with the first and second electrically conductive materials, and the portion is covered with resin or rubber.

12. The portable device for regulating water hardness according to claim 1, wherein each of the first and second electrically conductive materials is covered with a protective cloth.

13. The portable device for regulating water hardness according to claim 1, further comprising a collapsible container.

* * * * *